United States Patent
Bracken

(10) Patent No.: US 7,170,402 B2
(45) Date of Patent: Jan. 30, 2007

(54) AUTOMATIC BRAKING LIGHT

(76) Inventor: Gerald Bracken, Kilsallagh, Westport, Co. Mayo (IE)

( * ) Notice: Subject to any disclaimer, the term of this patent is extended or adjusted under 35 U.S.C. 154(b) by 164 days.

(21) Appl. No.: 11/071,595

(22) Filed: Mar. 2, 2005

(65) Prior Publication Data

US 2005/0200470 A1    Sep. 15, 2005

(30) Foreign Application Priority Data

Mar. 6, 2004    (GB)    ............... 0405079.5

(51) Int. Cl.
*B60Q 1/44*    (2006.01)
*B60Q 1/50*    (2006.01)
*B62J 3/00*    (2006.01)

(52) U.S. Cl. ............ 340/479; 340/427; 340/432; 340/467; 200/61.45 R; 200/61.49

(58) Field of Classification Search ........ 340/479, 340/467
See application file for complete search history.

(56) References Cited

U.S. PATENT DOCUMENTS

| | | | | | |
|---|---|---|---|---|---|
| 2,547,199 | A | * | 4/1951 | Dezzani | ........... 200/61.51 |
| 2,982,944 | A | * | 5/1961 | Weller | ........... 340/467 |
| 3,601,564 | A | * | 8/1971 | Ellison | ........... 200/61.48 |
| 3,731,022 | A | * | 5/1973 | Loftus | ........... 200/61.49 |
| 4,176,390 | A |  | 11/1979 | Galbert |  |
| 6,527,408 | B1 |  | 3/2003 | Korenek, Jr. |  |

FOREIGN PATENT DOCUMENTS

| | | |
|---|---|---|
| DE | 33 13678 A1 | 10/1984 |
| DE | 44 31 982 A1 | 3/1995 |
| DE | 296 00919 U1 | 5/1997 |
| DE | 298 12 874 U1 | 11/1998 |
| DE | 298 12876 U1 | 11/1998 |
| DE | 299 07 485 U1 | 1/2000 |

* cited by examiner

*Primary Examiner*—Donnie L. Crosland
(74) *Attorney, Agent, or Firm*—Darby & Darby

(57) ABSTRACT

An inertia-activated braking light (1) for attachment to pedal cycles and the like. A display of LEDs (15) is automatically illuminated on deceleration. This is achieved by an inertia mass closing a circuit on deceleration to provide electrical power to illuminate the light emitting diodes.

8 Claims, 4 Drawing Sheets

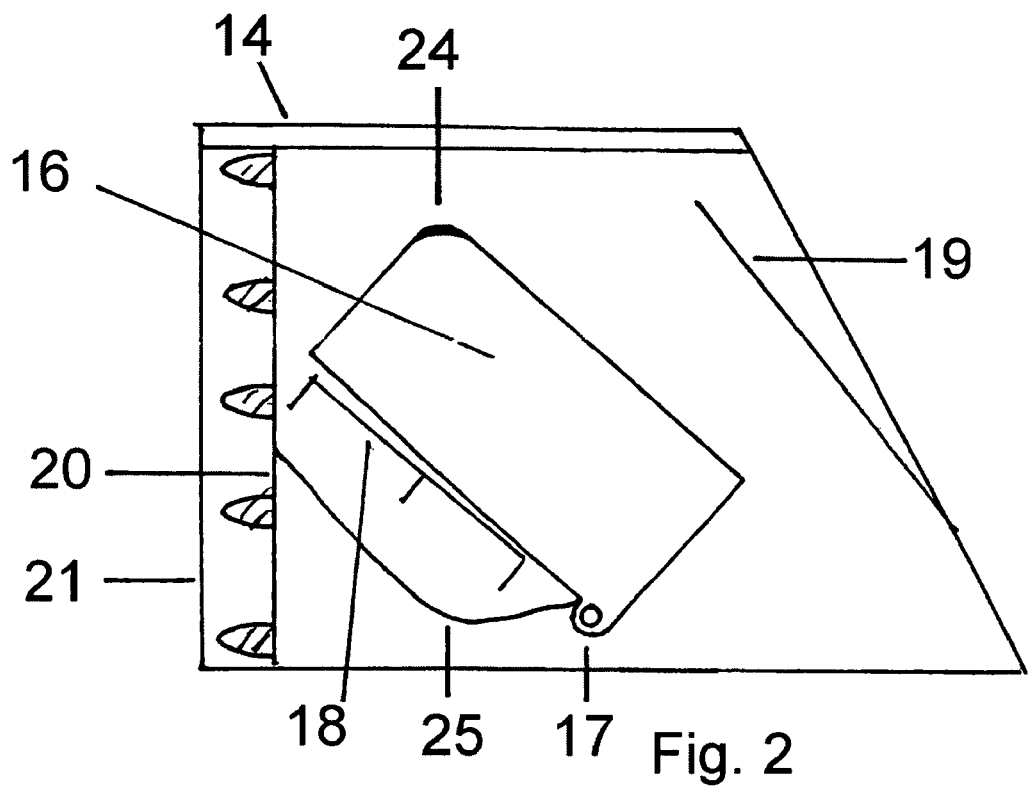
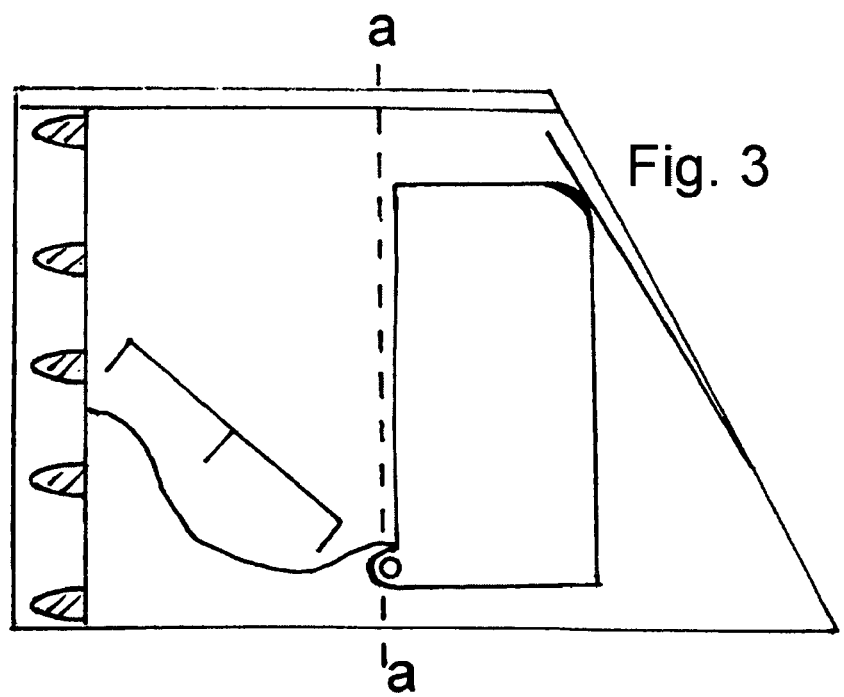

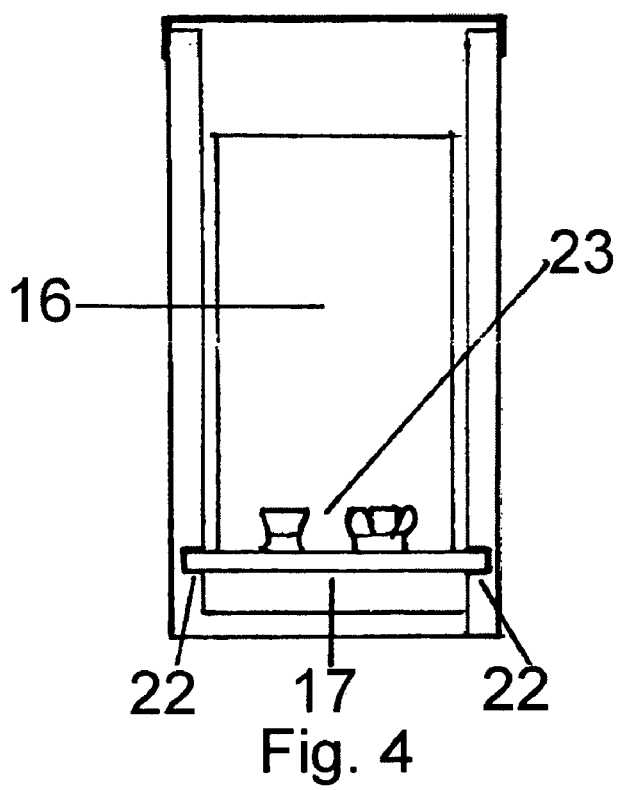
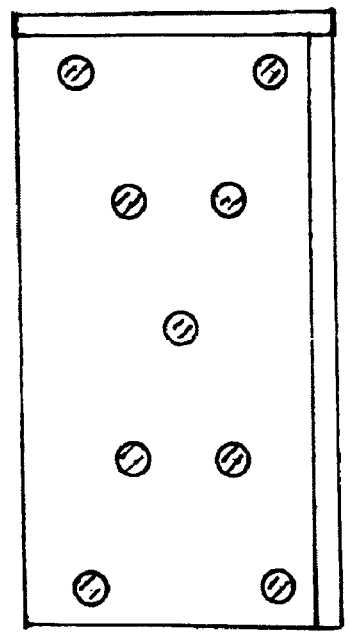
Fig. 4
Fig. 5

AUTOMATIC BRAKING LIGHT

FIELD OF THE INVENTION

This invention relates to an automatic braking light or stop light for pedal cycles and the like and is particularly applicable for vehicles with no electric system.

BACKGROUND TO THE INVENTION

Many pedal cyclists suffer injuries or death in traffic accidents every year. One reason for this is that acceleration and deceleration of a cyclist is erratic when compared to motor powered vehicles as it is influenced by factors such as incline of the road, the gear being used and the level of fatigue of the cyclist. As it is very difficult to predict acceleration and deceleration of a cyclist, other road users try to pass them by with a wider berth than they would typically give other road users. However, where a cyclist decelerates suddenly without warning and is in the path of another road user, it is sometimes too late to react properly by the time the other road user has realized the cyclist is/has decelerated.

STATEMENT OF INVENTION

According to an aspect of the present invention, there is provided an automatic braking light for a vehicle, the automatic braking light including an inertia driven switch circuit and a warning light, wherein the inertia driven switch circuit includes a holder for the power source arranged to swing overhead a pivot/axle from a stop where it is at rest forward to a resilient spring, the resilient spring being arranged to absorb the deceleration force and simultaneously connect the power source to the warning light during deceleration of the vehicle and thereby activate the warning light.

The present invention seeks to provide an automatic braking light that can be fixed to pedal cycles and other vehicles and is inertia-activated on deceleration. In a preferred embodiment, the braking light includes a case in which a battery in a holder swings overhead a pivot/axle from a stop where it is at rest forward to a resilient spring means which absorbs the deceleration force and simultaneously closes an electric circuit to a display of light emitting diodes to thereby provide a warning to other road users of the deceleration.

The holder is preferably arranged to swing in an arc between predetermined angles of rest and arrest, said angles being maintained by rigid attachment of the unit to the vehicle.

The resilient spring preferably comprises a leaf spring, the angle and tension of the leaf spring being selected so as to absorb the forward momentum of the holder on deceleration, and to deflect the holder to the rest position upon cessation of decelerating forces.

The resilient spring is preferably electrically conductive and is connected to the warning light which is in turn connectable to a pole of the power source, the other pole of the power source being connectable to an electrical contact on the exterior of the holder, the electrical contact being positioned to contact the resilient spring during deceleration and thereby close the switch circuit.

The warning light preferably includes a plurality of light emitting diodes. The light emitting diodes may be arranged in a cross shape.

The braking light may further comprise an override switch, the override switch being arranged to activate at least a number of the light emitting diodes light for continuous operation.

The braking light may further comprise a further light and a continuous operation switch, the further light being activatable by the continuous operation switch and being independent and visually distinguishable from the warning light.

BRIEF DESCRIPTION OF THE DRAWINGS

An embodiment of the present invention will now be described in detail, by way of example only, with reference to the accompanying drawings in which:

FIG. 2 is a sectional view of the braking light of FIG. 1 in an "off" position;

FIG. 3 is a sectional view of the braking light of FIG. 1 in an "on" position;

FIG. 4 is a sectional view along the line a—a of FIG. 3;

FIG. 5 is a plan view of a preferred configuration of a nine LED display for use in the braking light of FIG. 1; and, FIG. 6 is a schematic diagram of the circuit layout for the nine LED display of FIG. 5.

DETAILED DESCRIPTION

Figure 1:
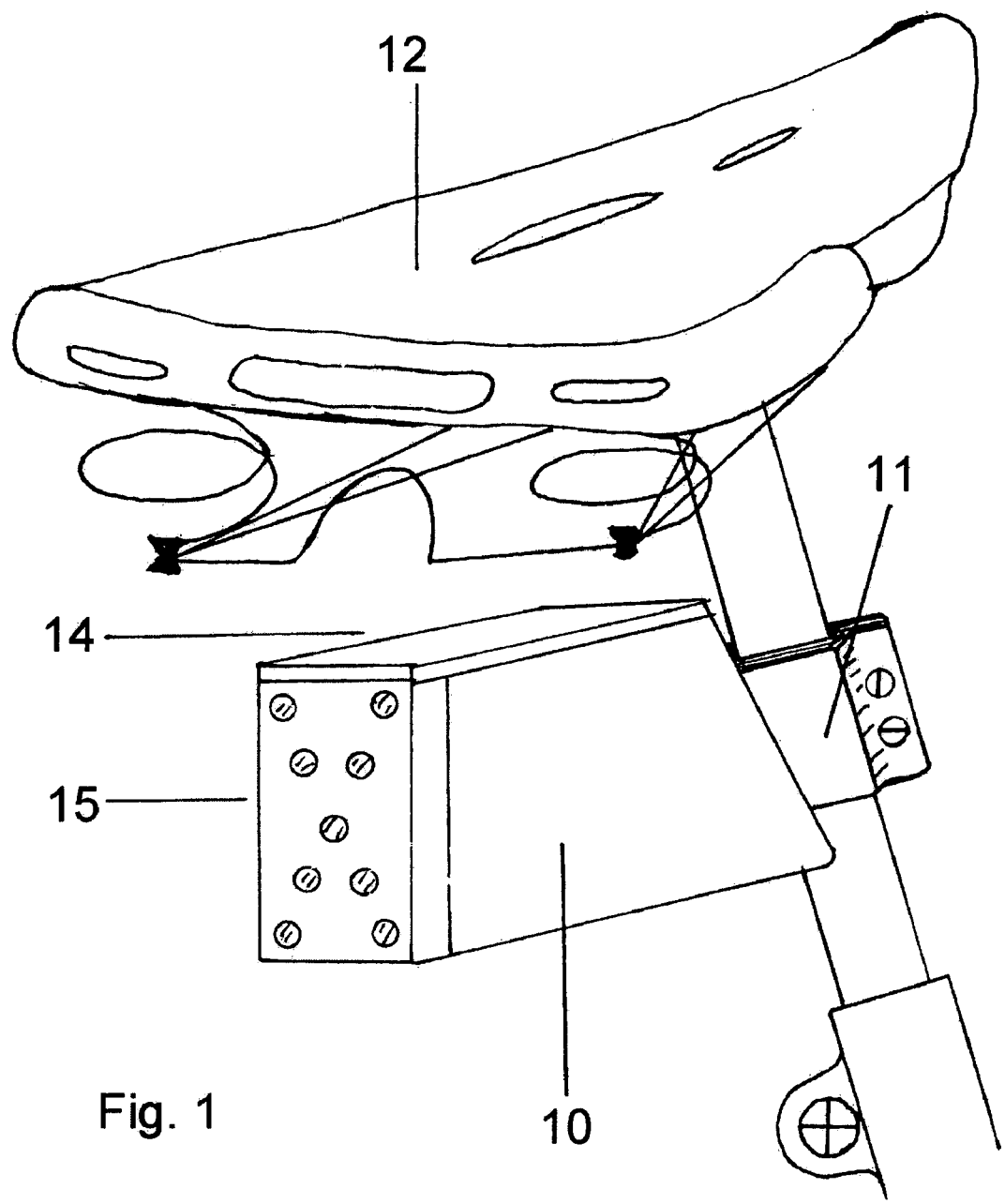
FIG. 1 shows, in perspective, a braking light according to an embodiment of the present invention fitted to a cycle frame.
Figure 6:
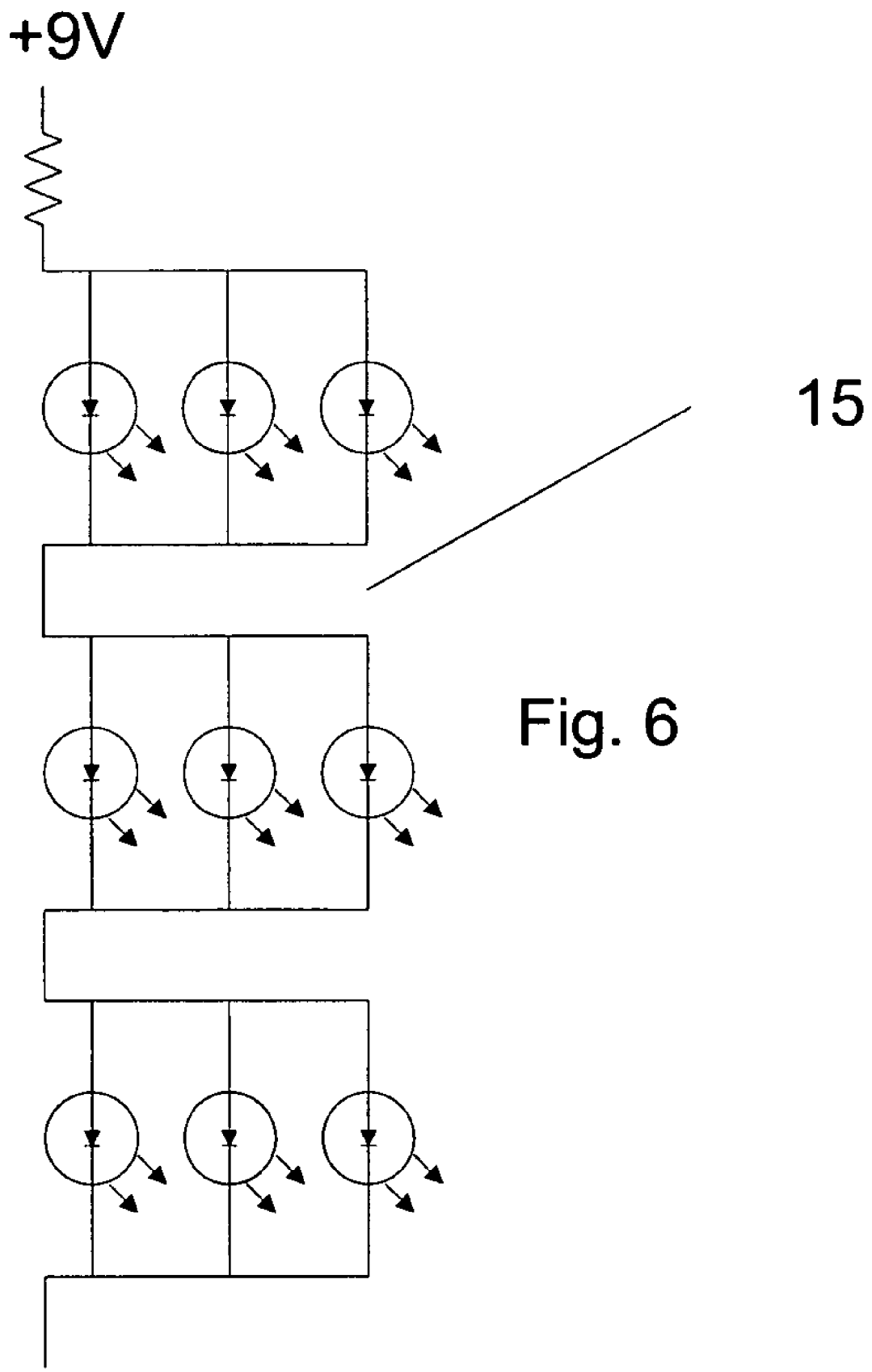

FIG. 1 shows, in perspective, a braking light according to an embodiment of the present invention fitted to a cycle frame. The braking light unit includes a compact case 10 secured to the cycle frame 2 under the saddle 12 by a rigid attachment bracket 11 which maintains the angle of operation of the components of the unit Access for battery replacement is via a lid 14 on top of the case 10. A nine LED display 15 projects to the rear.

FIG. 2 is a sectional view of the braking light of FIG. 1 in an "off" position and FIG. 3 is a sectional view of the braking light of FIG. 1 in an "on" position. The unit 1 includes a battery holder 16 that is arranged to pivot over an offset axle 17. In the "off" position, the battery holder 16 rests on a stop 18 at an angle of approximately 42° above horizontal. The nine LED display 15 is mounted on a printed circuit board 20 fitted towards the rear of the case 10, under a translucent cover 21.

The arc of forward movement of the holder 16 to an "on" position, as shown in FIG. 3, is confined to approximately 50°. The holder is arrested by an electrically conducting resilient spring 19 (preferably a leaf spring) and a forward stop/front wall of the case which is fixed at an angle of approximately 62° above horizontal.

FIG. 4 is a sectional view along the line a—a of FIG. 3. The battery holder 16 pivots over the axle 17 held in bearings 22 in the side walls of the case. In this example the inertia mass is provided by a PP3 9volt battery inserted into positive and negative sockets 23 inside the holder and clipped in place.

The positive socket is connected to a curved metal shoe 24 on the upper outside of the holder 16, which makes contact with the resilient spring 19 when the holder 16 is thrown forward on deceleration. The resilient spring 19 is connected to the positive feed of the LED display 15 via an integral circuit and resistor (not shown).

A flexible wire 25 connects the negative pole of the battery holder 16 to the negative feed of the LED display 15. Therefore, when the metal shoe 24 of the battery holder 16 contacts with the resilient spring 19, thereby closing the circuit and illuminating the LED display 15.

Further applications of this braking light are envisaged to all forms of wheeled conveyances such as tricycles, pedal rickshaws, wheelchairs, powered scooters and railway rolling stock. The system can be scaled down or enlarged to suit these situations. The nine LED arrangement also lends itself to a triangular configuration, although other numbers, colors or arrangements of LEDs (or other lighting elements) can be envisaged and substituted for those described herein. In addition or alternatively, other warning means could be used, such as a horn, a bell, a mechanical indicator or an electronic display.

The lighting time of the LED can be prolonged by the addition of a capacitor or similar element or circuit.

The braking light can be modified to incorporate a continuous three-LED display tail light with manual switch for night operation. The three-LED display may be of a different pattern and/or color to the warning light and mounted in the same housing. Alternatively, three LEDs could be illuminated with the remainder being activated when the braking circuit is closed.

It will be appreciated that other inertia change detection systems could be substituted for the battery mounted in a battery holder pivoting over an axle. For example, a mercury based switch or the like could be used. In addition, an incline sensor (again such as a mercury based switch) could be used to avoid the brake light activating when cycling down an incline, over potholes and the like. It will also be appreciated that other power sources could be substituted for batteries, for example a rechargeable power source (charged by an external source or by a dynamo attached to the cycle).

It will also be appreciated that the braking light could be attached to the vehicle at other points using an appropriate mount

The invention claimed is:

1. An automatic braking light for a vehicle, the automatic braking light including an inertia driven switch circuit and a warning light, wherein the inertia driven switch circuit includes a holder for the power source arranged to swing overhead a pivot/axle from a stop where it is at rest forward to a resilient spring, the resilient spring being arranged to absorb an deceleration force and simultaneously connect the power source to the warning light during deceleration of the vehicle and thereby activate the warning light.

2. An automatic braking light as claimed in claim 1, wherein the holder is arranged to swing in an arc between predetermined angles of rest and arrest, said angles being maintained by rigid attachment of the unit to the vehicle.

3. An automatic braking light as claimed in claim 1, wherein the resilient spring comprises a leaf spring, the angle and tension of the leaf spring being selected so as to absorb the forward momentum of the holder on deceleration, and to deflect the holder to the rest position upon cessation of decelerating forces.

4. An automatic braking light according to claim 1, wherein the resilient spring is electrically conductive and is connected to the warning light which is in turn connectable to a pole of the power source, the other pole of the power source being connectable to an electrical contact on the exterior of the holder, the electrical contact being positioned to contact the resilient spring during deceleration and thereby close the switch circuit.

5. An automatic braking light according to claim 1, wherein the warning light includes a plurality of light emitting diodes.

6. An automatic braking light according to claim 5, wherein the light emitting diodes are arranged in a cross shape.

7. An automatic braking light according to claim 5, further comprising an override switch, the override switch being arranged to activate at least a number of the light emitting diodes light for continuous operation.

8. An automatic braking light according to claim 1, further comprising a further light and a continuous operation switch, the further light being activatable by the continuous operation switch and being independent and visually distinguishable from the warning light.

* * * * *